United States Patent [19]

Kochanski

[11] Patent Number: 5,207,545
[45] Date of Patent: May 4, 1993

[54] THREADED FASTENER

[75] Inventor: Ronald P. Kochanski, Arlington Heights, Ill.

[73] Assignee: Motorola, Inc., Schaumburg, Ill.

[21] Appl. No.: 860,612

[22] Filed: Mar. 30, 1992

[51] Int. Cl.$^5$ .................. F16B 23/00; F16B 35/02
[52] U.S. Cl. .................. 411/383; 411/403; 411/410; 206/338; 29/525.1
[58] Field of Search ............. 411/403, 404, 405, 410, 411/395, 383, 445, 919, 966; 81/436, 437; 206/338, 343; 29/456, 525.1

[56] References Cited

U.S. PATENT DOCUMENTS

| | | | |
|---|---|---|---|
| 2,366,510 | 1/1945 | Frank | 411/445 |
| 4,848,405 | 7/1989 | Albrecht | 411/403 |
| 4,878,794 | 11/1989 | Potucek | 411/395 |
| 4,998,452 | 3/1991 | Blum | 206/338 X |

FOREIGN PATENT DOCUMENTS 1341908 12/1973 United Kingdom ............ 411/383

*Primary Examiner*—Neill R. Wilson
*Attorney, Agent, or Firm*—Timothy W. Markison; Steven G. Parmalee

[57] ABSTRACT

A threaded fastener that includes a drive head having a recessed region and a threaded shaft that is mechanically and radially attached to the drive head is improved to comprise a drive portion. The drive portion is mechanically attached to the opposite end of the threaded shaft as a drive head and has a geometric shape that is a mating image of the recessed portion of the drive head and is on the same axis as the drive head. With such a configuration, the drive portion of one threaded fastener can be mechanically coupled to the recessed region of another threaded fastener in a stacked fashion such that one threaded fastener is used to drive another threaded fastener into a threaded receptacle.

5 Claims, 1 Drawing Sheet

THREADED FASTENER

FIELD OF THE INVENTION

This invention relates generally to threaded fasteners and in particular to an improved stackable threaded fastener.

BACKGROUND OF THE INVENTION

Threaded fasteners are known to secure separate pieces together. For example, threaded fasteners are used to secure a printed circuit (PC) board to a chassis, etc. Typically, the threaded fasteners is manually positioned and secured with a driver such as a screw driver, alan wrench, wrench, etc. Recent advancements in technology have allowed certain threaded fasteners to be automatically placed and secured. Such threaded fastener, with the use of special pick and placement equipment, may be individually picked and placed into position. Once in position, the pick and placement equipment may secure the threaded fastener into place or another piece of equipment may be required to secure the threaded fastener.

The automatic placement method is an improvement over manual installation of threaded fasteners, however, the pick and placement process is done on an individual basis. Therefore, a need exists for an improved threaded fastener that allows for multiple placements.

SUMMARY OF THE INVENTION

These needs and others are substantially met by the improved threaded fastener disclosed herein. The improved threaded fastener includes a drive head that has a recessed region and a threaded shaft mechanically and radially attached to the drive head, wherein the improvement comprises a drive portion that is mechanically attached to the opposite end of the threaded shaft as the drive head. In addition, the drive portion has a geometric shape that is a mating image of the recess portion of the drive head and is on the same axis as the drive head, such that the drive portion of one improved threaded fastener can be mechanically coupled to the recessed region of another improved threaded fastener in a stacked fashion. Having threaded fasteners in a stacked fashion, one improved threaded fastener may drive another improved threaded fastener into a threaded receptacle.

DESCRIPTION OF A PREFERRED EMBODIMENT

Figure 1:
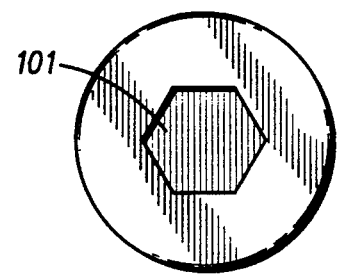
FIG. 1 illustrates a threaded fastener that includes a drive portion in accordance with the present invention.

FIG. 1 illustrates a threaded fastener that comprises of a drive head 100, recessed region 101, a threaded shaft 102, and a drive portion 103. The recessed region 101 can have any geometric shape that permits fastener rotation when an internal torque is applied. For example, the recess region 101 may have any of the following shapes: hexagon, splined, slotted, phillips, or polygonal shape. The drive portion 103 will have a geometric shape that is the mating image of the recessed region. The threaded shaft 102 consists of any standard thread form, for example, #4-40. The threaded fastener may be fabricated by a standard cold heading manufacturing and thread rolling processing.

Figure 2:
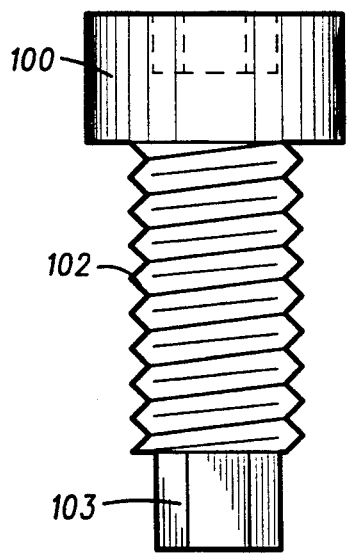
FIG. 2 illustrates a stack of threaded fasteners positioned in a drive tube cartridge in accordance with the present invention.
Figure 2:
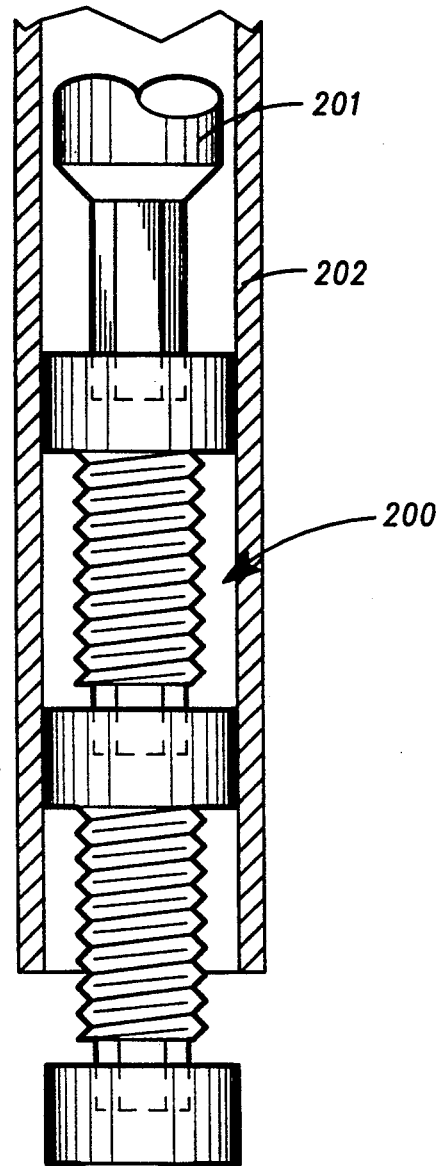
Figure 2:
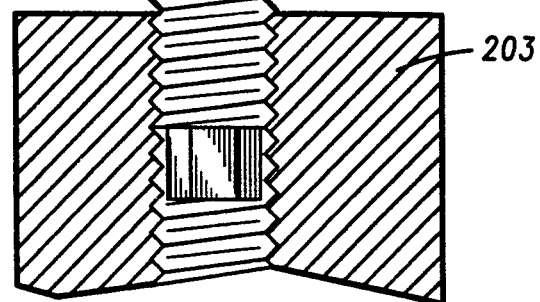

FIG. 2 illustrates a stack of threaded fasteners 200 in a driver tube cartridge guide 202, and a driver tool bit 201. The threaded fasteners in the stack 200 may be held together by an adhesive that has minimal bonding force. To insert one of the threaded fasteners into a threaded receptacle 203, axial force and radial torque is applied to the stack by the driver tool bit 201. The driver tool bit 201 then secures the threaded fastener into the threaded receptacle 203, wherein the radial torque is transferred from the driver tool bit through the stack 200 to the threaded fastener being inserted. Once the threaded fastener is secured, the driver tube cartridge guide 202 is removed causing the adhesive, if any, to be broken such that the driver tube cartridge guide can be repositioned.

The improved threaded fastener of the present invention allows for more efficient auto insertion and fastening of threaded fasteners. By forming a drive portion on the threaded shaft, threaded fasteners can be stacked and used to apply drive force to other threaded fasteners in the stack. The drive portion has a geometric shape that is the mating image of the drive head recessed region. For example, if the recessed region is a phillips head, the drive portion will have the same shape as the tip of a phillips screwdriver.

I claim:

1. An improved threaded fastener that includes a drive head that has a recessed region and a threaded shaft mechanically axially attached to the drive head, the improvement comprises a drive portion mechanically attached to the opposite end of the threaded shaft as the drive head, wherein the drive portion has a geometric shape that is a mating image of the recessed portion of the drive head and is on the same axis as the drive head, such that the drive portion of one improved threaded fastener is mechanically mated to the recessed region of another improved threaded fastener in a stacked fashioned and the one improved threaded fastener is used to drive the another improved threaded fastener into a threaded receptacle.

2. In the improved threaded fastener of claim 1, the recessed region comprises a hexagonal geometric shape.

3. In the improved threaded fastener of claim 1, the recessed region comprises a slotted geometric shape.

4. A method for installing a threaded fastener into a threaded receptacle, wherein each of the threaded fasteners includes a threaded shaft and a drive head that has a recessed portion, the method comprises the steps of:

a) forming a drive portion on each of the threaded fasteners on the opposite end of the threaded fastener as the drive head, wherein the drive portion has a geometric shape that is a mating image of the recessed portion of the drive head and is on the same axis as the drive head;

b) inserting the drive portion of a first threaded fastener into the recessed portion of a second threaded fastener to produce a threaded fastener stack;

c) when the threaded fastener stack is used, positioning the threaded fastener stack in proximity of the threaded receptacle, such that the drive portion of the second threaded fastener is axially aligned with the threaded receptacle; and d) when the threaded stack is positioned, applying a driver to the recessed portion of the first threaded fastener such that the second threaded fastener is driven into the threaded receptacle.

5. In the method of claim 4, step (b) further comprises applying an adhesive to the drive portion of the first threaded fastener such that the first threaded fastener and the second threaded fastener are bonded together.

* * * * *